(12) United States Patent
Calpito

(10) Patent No.: US 10,308,171 B1
(45) Date of Patent: Jun. 4, 2019

(54) SET OF AUXILIARY VEHICLE LIGHTS

(71) Applicant: Manuel B. Calpito, Los Angeles, CA (US)

(72) Inventor: Manuel B. Calpito, Los Angeles, CA (US)

( * ) Notice: Subject to any disclaimer, the term of this patent is extended or adjusted under 35 U.S.C. 154(b) by 0 days.

(21) Appl. No.: 15/918,894

(22) Filed: Mar. 12, 2018

(51) Int. Cl.
  *B60Q 1/46* (2006.01)
  *B60R 1/12* (2006.01)
  *B60Q 1/26* (2006.01)
  *B60Q 1/50* (2006.01)

(52) U.S. Cl.
  CPC ............. *B60Q 1/46* (2013.01); *B60Q 1/2665* (2013.01); *B60Q 1/503* (2013.01); *B60R 1/1207* (2013.01)

(58) Field of Classification Search
  CPC .... B60R 1/1207; B60Q 1/2665; B60Q 1/442; B60Q 1/50; B60Q 3/258; B60Q 1/54
  See application file for complete search history.

(56) References Cited

U.S. PATENT DOCUMENTS

| | | | |
|---|---|---|---|
| 5,119,278 A | 6/1992 | Watson | |
| 5,124,845 A | 6/1992 | Shimojo | |
| 5,379,198 A * | 1/1995 | Zhang | B60Q 1/2665 359/844 |
| 6,511,216 B2 | 1/2003 | Strickland | |
| 6,927,682 B1 * | 8/2005 | Touhey | B60K 35/00 340/457.4 |
| 7,659,808 B1 | 2/2010 | Cooper et al. | |
| 2003/0227375 A1 | 12/2003 | Yong | |
| 2005/0083183 A1 | 4/2005 | Cao et al. | |
| 2016/0266577 A1 * | 9/2016 | Kerzner | G05D 1/0022 |
| 2017/0057407 A1 | 3/2017 | Gee et al. | |
| 2017/0166067 A1 * | 6/2017 | Panopoulos | F21V 14/02 |

FOREIGN PATENT DOCUMENTS

GB    2407907 A    5/2005

* cited by examiner

*Primary Examiner* — Orlando Bousono
*Assistant Examiner* — Anthony D Afrifa-Kyei
(74) *Attorney, Agent, or Firm* — Richard C. Litman

(57) ABSTRACT

The set of auxiliary vehicle lights includes auxiliary hazard lights in combination with additional lights for non-verbal communication with drivers of other vehicles. The set of auxiliary vehicle lights includes a housing having opposed upper and lower ends, defining first and second chambers. Each of the first and second chambers has an open front end and an open rear end. First and second sets of light sources are mounted within the first and second chambers, respectively, of the housing. Each of the first and second sets of light sources includes a hazard light and a communication light. A hook is provided for releasably attaching the housing to a rearview mirror of the vehicle.

4 Claims, 6 Drawing Sheets

SET OF AUXILIARY VEHICLE LIGHTS

BACKGROUND

1. Field

The disclosure of the present patent application relates to vehicle signal lights, and particularly to a set of auxiliary vehicle lights that includes auxiliary hazard lights in combination with additional lights for non-verbal communication with drivers of other vehicles.

2. Description of the Related Art

Modern motor vehicles, such as automobiles, trucks and the like, are equipped with front and rear sets of hazard lights for signaling to other motorists that a vehicle has become a potential hazard for other users of the road. The front hazard lights are typically positioned adjacent the vehicle's headlights, and the rear hazard lights are typically positioned adjacent the vehicle's brake lights. Thus, in order for other motorists to see the hazard lights, they must be able to see the rear portion of the vehicle. However, in emergency conditions, the rear portion of the vehicle may be difficult to see. Thus, it would be desirable to have additional hazard lights that are visible when viewing the top half of the vehicle.

Additionally, non-verbal communication between drivers is typically limited solely to the use of vehicle horns and to hand gestures. For purposes of road courtesy and etiquette, these methods are often inadequate. For example, if one driver allows another driver to pass, the passing driver may wish to express gratitude for the first driver's courtesy. Use of the vehicle horn for this purpose would not be appropriate, and a hand wave may not be visible, particularly at night. Thus, it would be desirable to be able to non-verbally communicate with other drivers in both a courteous manner and in a way that would not be a distraction to any drivers on the road. Thus, a set of auxiliary vehicle lights solving the aforementioned problems is desired.

SUMMARY

The set of auxiliary vehicle lights includes auxiliary hazard lights in combination with additional lights for non-verbal communication with drivers of other vehicles. The set of auxiliary vehicle lights includes a housing having opposed upper and lower ends, defining first and second chambers. Each of the first and second chambers has an open front end and an open rear end. First and second sets of light sources are respectively mounted within the first and second chambers of the housing. Each of the first and second sets of light sources includes a hazard light and a communication light. The hazard light and the communication light each have a unique and distinct color associated therewith. For example, each hazard light may be amber, similar to the conventional hazard lights used on motor vehicles, and each communication light may be white.

In use, the first set of light sources, mounted in the first chamber of the housing, face forward, selectively emitting light through the open front end of the first chamber. The second set of light sources, mounted in the second chamber of the housing, face rearward, selectively emitting light through the open rear end of the second chamber. In an emergency or other hazardous condition, the hazard light of each of the first and second sets of light sources can be used simultaneously with the vehicle's conventional hazard lights, thus improving visibility of the hazard lights, both in front of and in rear of the vehicle. The communication light may be used to send non-verbal communication to other drivers. For example, if a first driver allows a second driver to pass the first driver on the road, the second driver may selectively illuminate the communication light of the second set of light sources, which faces to the rear of the second driver. This signal may be interpreted, for example, as "Thank you." The first driver may then selectively illuminate the communication light of the first set of light sources, which faces to the front of the first driver, which may be interpreted, for example, as "You're welcome."

A hook is provided for releasably attaching the housing to a rearview mirror of the vehicle. The hook includes an upper end and a lower end, the lower end of the hook being secured to the upper end of the housing, and the upper end of the hook being adapted for releasable attachment to the rearview mirror.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
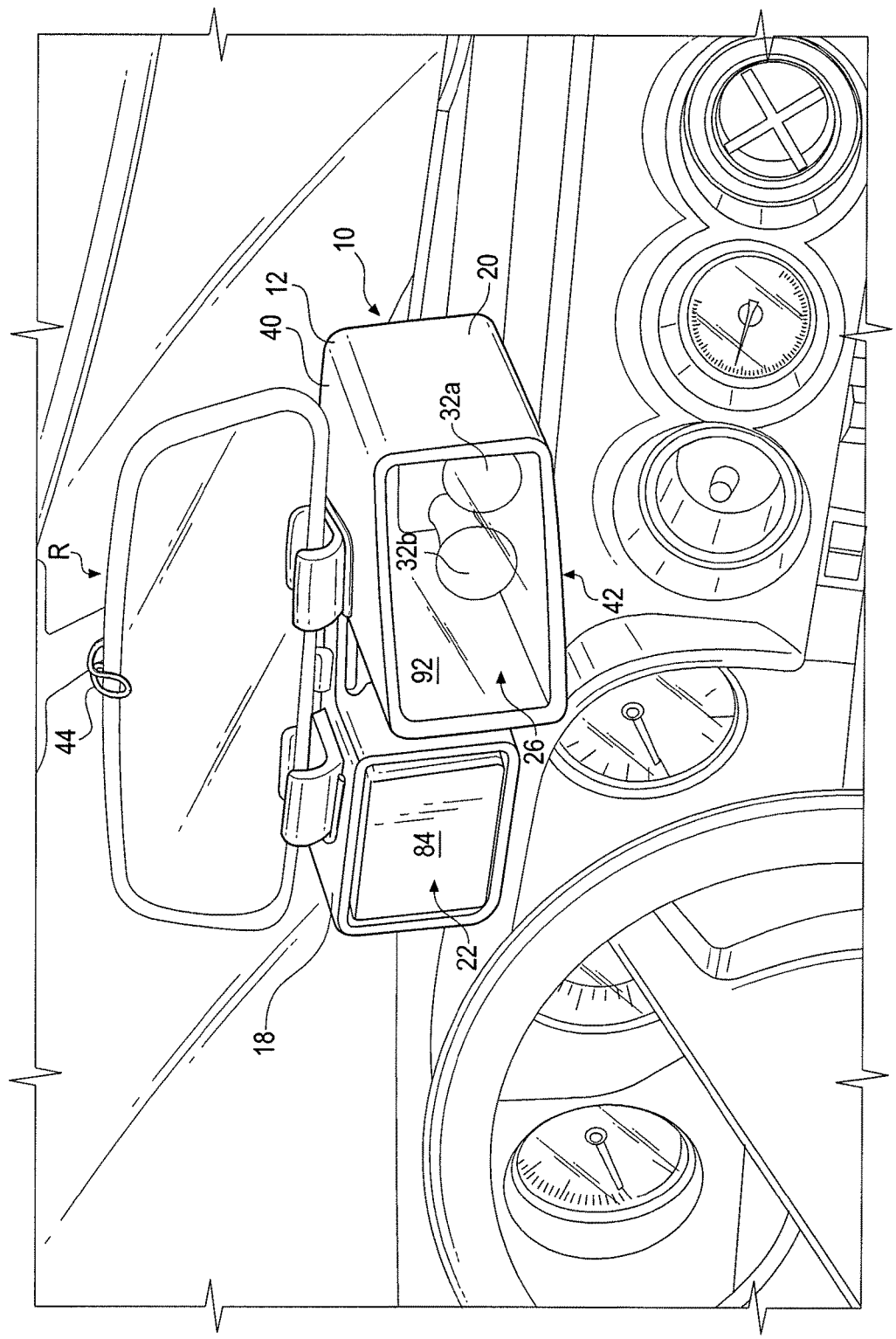
FIG. 1 is an environmental perspective view of a set of auxiliary vehicle lights, shown facing the rear of the vehicle.
Figure 2:
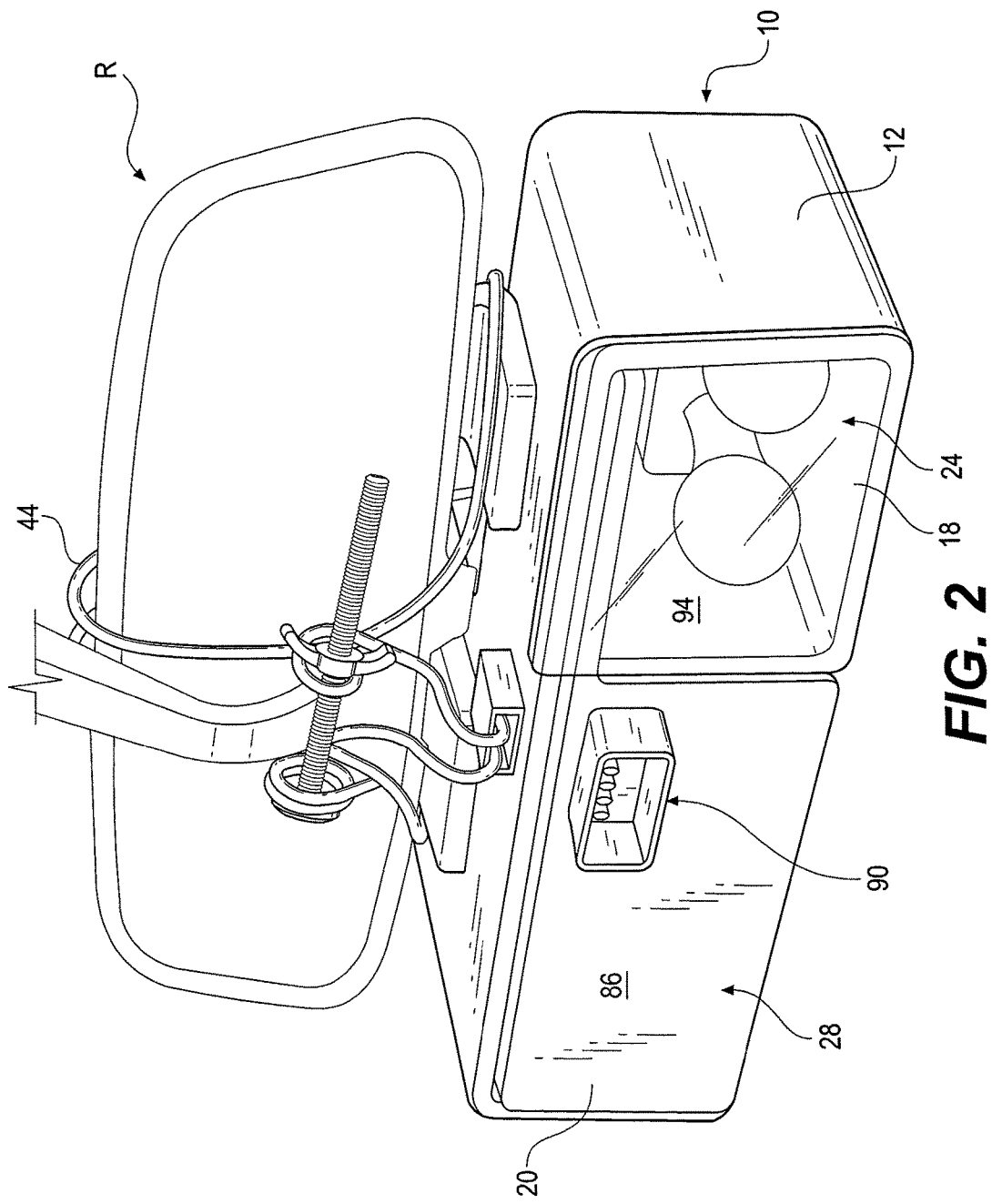
FIG. 2 is an environmental perspective view of the set of auxiliary vehicle lights of FIG. 1, shown facing the front of the vehicle.

The set of auxiliary vehicle lights 10 includes auxiliary hazard lights in combination with additional lights for non-verbal communication with drivers of other vehicles. As best shown in FIGS. 1-3 and 6, the set of auxiliary vehicle lights 10 includes a housing 12 having opposed upper and lower ends 40, 42, respectively, defining first and second chambers 18, 20. Each of the first and second chambers 18, 20 has an open front end 24, 28, respectively, and an open rear end 22, 26. As shown in FIGS. 1 and 2, the open rear end 26 of the second chamber 20 may be covered by a transparent or translucent window 92 and, similarly, and open front end 24 of first chamber 18 may be covered by a transparent or translucent window 94.

Figure 3:
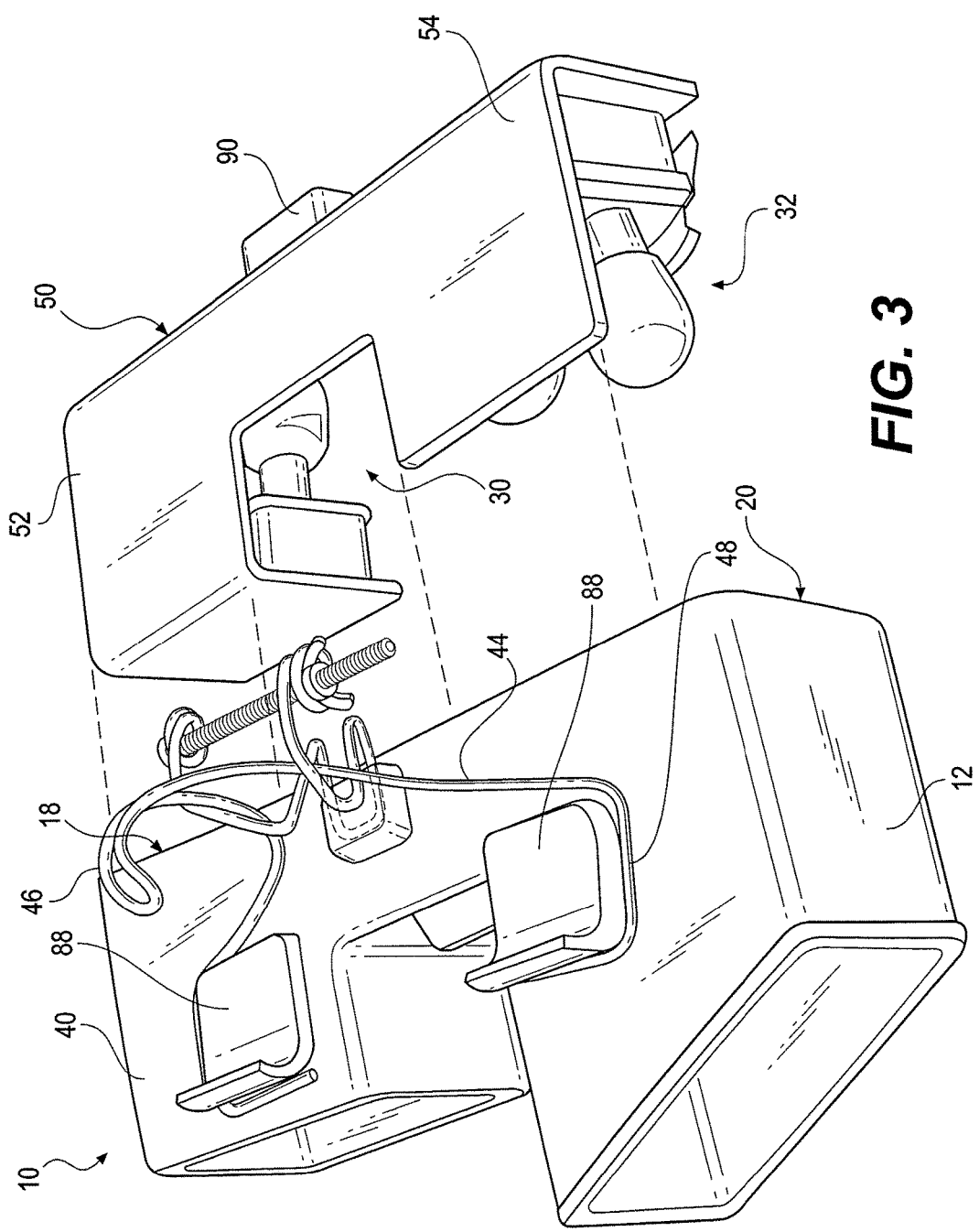
FIG. 3 is a partially exploded perspective view of the set of auxiliary vehicle lights of FIG. 1.
Figure 6:
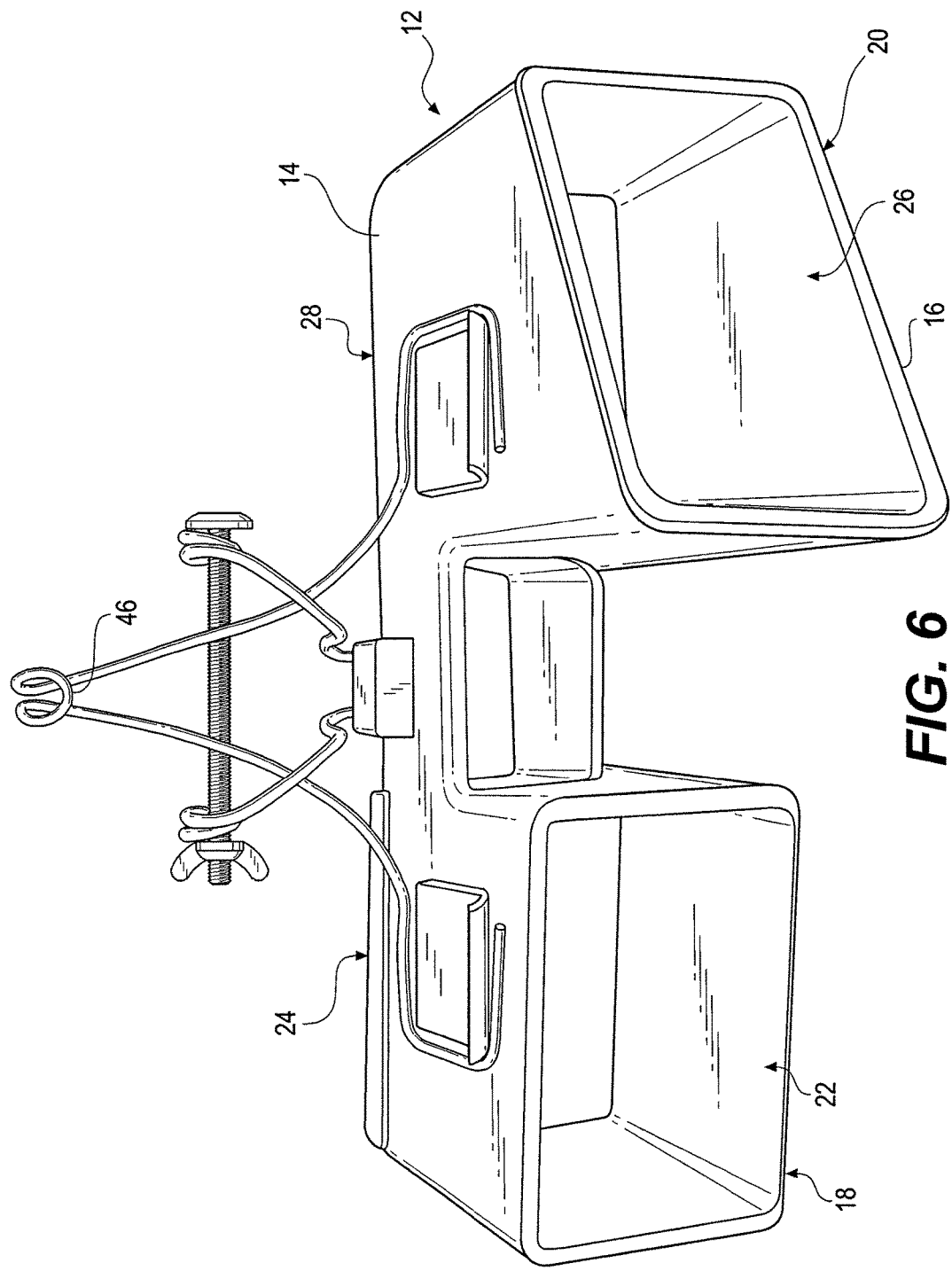
FIG. 6 is a perspective view of a housing of the set of auxiliary vehicle lights of FIG. 1.

As best seen in FIGS. 1, 3 and 6, first and second sets of light sources 30, 32, respectively, are respectively mounted within the first and second chambers 18, 20 of the housing 12. The first set of light sources 30 includes a hazard light 30*a* and a communication light 30*b*. Similarly, the second set of light sources 32 includes a hazard light 32*a* and a communication light 32*b*. The hazard lights 30*a*, 32*a* and the communication lights 30*b*, 32*b* each have a unique and distinct color associated therewith. For example, each hazard light 30*a*, 32*a* may be amber, similar to the conventional hazard lights used on motor vehicles, and each communication light 30*b*, 32*b* may be white.

Figure 5:
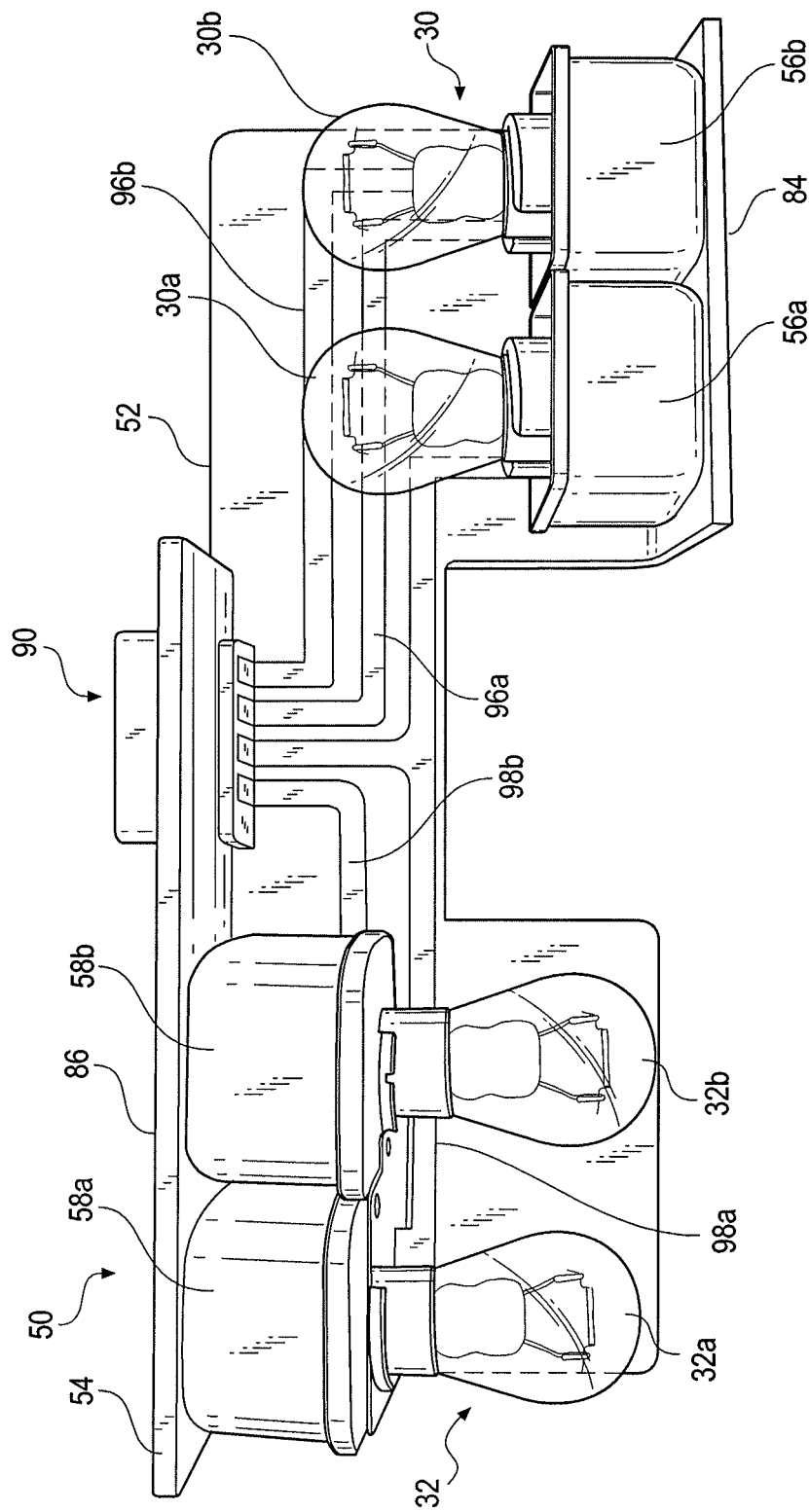
FIG. 5 is a bottom view of a light source support of the set of auxiliary vehicle lights of FIG. 1.

As best shown in FIGS. 3 and 5, a light source support 50 may be used with housing 12. The light source support 50 includes first and second portions 52, 54, respectively, with first and second pairs of electrical fixtures 56a, 56b and 58a, 58b being respectively mounted to the first and second portions 52, 54 for respectively receiving the first and second sets of light sources 30, 32, respectively. As shown, line 96a connects electrical fixture 56b to a port 90 and line 96b connects electrical fixture 56b to the port 90. Similarly, line 98a connects electrical fixtures 58a and 56a to port 90, and line 98b connects electrical fixture 58b to port 90. Port 90 may be connected to the vehicle's power supply and electrical system, allowing the vehicle's battery to provide power for the first and second sets of light sources 30, 32, respectively, and allowing the vehicle's electrical control system to be used for selective actuation of hazard lights 30a, 32a and communication lights 30b, 32b.

Electrical fixtures 56a, 56b of the first portion 52 may be mounted on plate 84, as shown. Similarly, electrical fixtures 58a, 58b of the second portion 54 may be mounted on plate 86, as shown. As best seen in FIGS. 1 and 2, when the light source support 50 is mounted within the housing 12, the plate 84 covers the open rear end 22 of the first chamber 18, and the plate 86 covers the open front end 28 of the second chamber 20.

Figure 4:
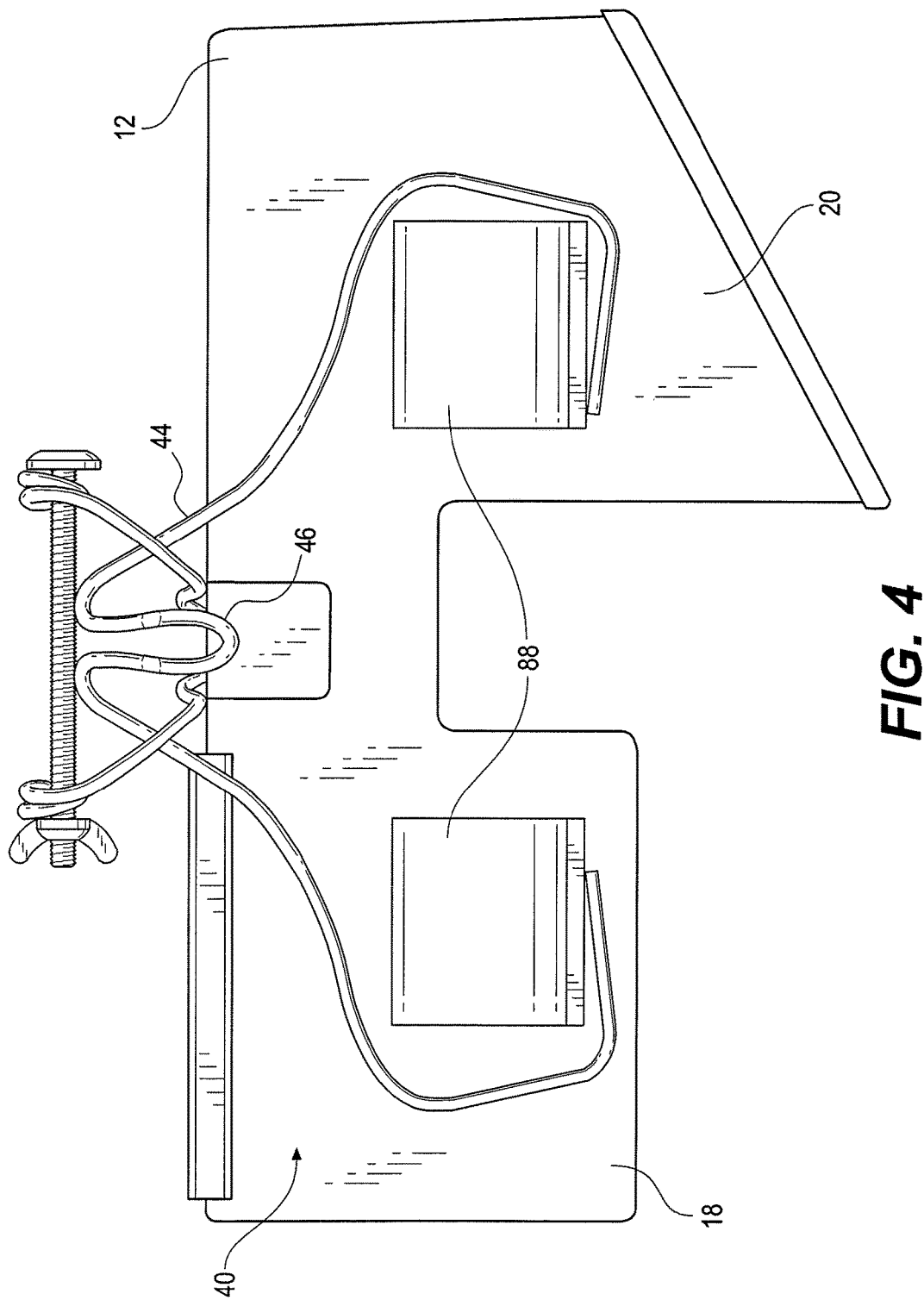
FIG. 4 is a top view of the set of auxiliary vehicle lights of FIG. 1.

A hook 44 or the like is provided for releasably attaching the housing 12 to a rearview mirror R of the vehicle. As best shown in FIG. 3, the hook 44 includes an upper end 46 and a lower end 48. The lower end 48 of the hook 44 is secured to the upper end of the housing 12, and the upper end 46 of hook 44 is adapted for releasable attachment to the rearview mirror R. As shown in FIGS. 3 and 4, the lower end 48 of the hook 44 may be branched for engaging support members 88 mounted on the upper end 40 of the housing 12. It should be understood that any suitable type of releasable attachment or connector may be used for releasably securing the housing 12 to the rearview mirror R.

In use, the first set of light sources 30, mounted in the first chamber 18 of the housing 12, face forward, as shown, selectively emitting light through the window 94 covering the open front end 24 of the first chamber 18. The second set of light sources 32, mounted in the second chamber 20 of the housing 12, face rearward, selectively emitting light through the window 92 covering open rear end 26 of second chamber 20. In an emergency or other hazardous condition, the hazard light 30a, 32a of each of the first and second sets of light sources 30, 32, respectively, can be used simultaneously with the vehicle's conventional hazard lights, thus improving visibility of the hazard lights, both in front of and in rear of the vehicle. The communication lights 30b, 32b may be used to send non-verbal communication to other drivers. For example, if a first driver allows a second driver to pass the first driver on the road, the second driver may selectively illuminate the communication light 32b of the second set of light sources 32, which faces to the rear of the second driver. This signal may be interpreted, for example, as "Thank you." The first driver may then selectively illuminate the communication light 30b of the first set of light sources 30, which faces to the front of the first driver, which may be interpreted, for example, as "You're welcome."

It is to be understood that the set of auxiliary vehicle lights is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A set of auxiliary vehicle lights for attaching to a rearview mirror of a vehicle, comprising:
    a housing having opposed upper and lower ends, the housing defining first and second chambers, each of the chambers having an open front end and an open rear end;
    first and second sets of light sources mounted within the first and second chambers of the housing, respectively, each of the first and second sets of light sources including a hazard light and a communication light, the hazard light and the communication light each having a unique and distinct color associated therewith;
    a hook having an upper end and a lower end, the lower end of the hook being secured to the upper end of the housing, and the upper end of the hook being adapted for releasable attachment to the rearview mirror of the vehicle;
    a light source support having first and second portions, wherein the first portion of the light source support has a first plate and the second portion of the light source support has a second plate, further wherein the light source support is mounted within the housing such that the first plate covers the open rear end of the first chamber, and the second plate covers the open front end of the second chamber;
    first and second pairs of electrical fixtures mounted to the first and second portions, respectively, the first and second pairs of electrical fixtures receiving the first and second sets of light sources, respectively, wherein, the first pair of electrical fixtures being mounted on the first plate, and the second pair of electrical fixtures being mounted on the second plate; and
    an electrical port mounted on the second plate, the first and second pairs of electrical fixtures being in electrical communication with the electrical port.

2. The set of auxiliary vehicle lights as recited in claim 1, further comprising first and second support members secured to the upper end of the housing, respectively adjacent the first and second chambers.

3. The set of auxiliary vehicle lights as recited in claim 2, wherein the lower end of the hook is branched to define first and second engaging ends, the first and second engaging ends being respectively secured to the first and second support members.

4. A set of auxiliary vehicle lights for attaching to a rearview mirror of a vehicle, comprising:
    a housing having opposed upper and lower ends, the housing defining first and second adjacent chambers, the first chamber having an open front end and a closed rear end and the second chamber having an open rear end and an closed front end;
    first and second sets of light sources mounted within the first and second chambers of the housing, respectively, each of the first and second sets of light sources including a hazard light and a communication light, the hazard light and the communication light each having a unique and distinct color associated therewith;
    first and second pairs of electrical fixtures mounted to the first and second adjacent chambers, respectively, the first and second pairs of electrical fixtures receiving the first and second sets of light sources, respectively;
    means for releasably attaching the set of auxiliary lights to the rearview mirror of the vehicle; and an electrical port mounted on the housing, the first and second pairs of electrical fixtures being in electrical communication with the electrical port.

\* \* \* \* \*